United States Patent
Phelps

(10) Patent No.: US 6,378,691 B2
(45) Date of Patent: Apr. 30, 2002

(54) PRODUCT COLLATOR

(75) Inventor: James M. Phelps, Cincinnati, OH (US)

(73) Assignee: Planet Products Corporation, Cincinnati, OH (US)

( * ) Notice: Subject to any disclaimer, the term of this patent is extended or adjusted under 35 U.S.C. 154(b) by 0 days.

(21) Appl. No.: 09/851,797

(22) Filed: May 9, 2001

Related U.S. Application Data

(62) Division of application No. 09/430,789, filed on Oct. 29, 1999, now Pat. No. 6,257,393.

(51) Int. Cl.$^7$ .............................................. B65G 47/26
(52) U.S. Cl. ....................................................... 198/456
(58) Field of Search ........................... 198/397.01, 443, 198/456

(56) References Cited

U.S. PATENT DOCUMENTS

| | | |
|---|---|---|
| 1,194,990 A | 8/1916 | Gaynor |
| 1,582,820 A | 4/1926 | Hungerford |
| 1,627,899 A | 5/1927 | Heath |
| 1,824,414 A * | 9/1931 | Stein .......................... 198/456 |
| 2,159,851 A | 5/1939 | Hicks |
| 2,209,340 A | 7/1940 | Landry |
| 2,920,743 A | 1/1960 | Fradenburgh |
| 3,103,054 A | 9/1963 | Ingham et al. |
| 3,182,786 A | 5/1965 | Reimers |
| 3,214,001 A | 10/1965 | Callaghan |
| 3,214,008 A | 10/1965 | Warrick |
| 3,342,301 A | 9/1967 | Miller et al. |

(List continued on next page.)

FOREIGN PATENT DOCUMENTS

| | | |
|---|---|---|
| CA | 1014122 | 7/1977 |
| DE | 217955 | 11/1961 |
| FR | 992684 | 10/1951 |
| JP | 3-232625 | 10/1991 |
| JP | 5-221519 | 8/1993 |
| NL | 36774 | 10/1935 |

OTHER PUBLICATIONS

Brochure entitled *"High Performance Loading Systems"*, by F.R. Drake Company (date unknown).

*Primary Examiner*—Kenneth W. Noland
*Assistant Examiner*—Joe Dillon, Jr.
(74) *Attorney, Agent, or Firm*—Thompson Hine LLP

(57) ABSTRACT

The present invention provides a product collator for unscrambling scrambled products received at an input point, such as a hopper, and for delivering the unscrambled products to an output point, such as a transfer conveyor. The collator includes an endless conveyor belt made up of a plurality of laterally extending flights. The conveyor belt includes a first, generally upwardly and forwardly extending path and a second, generally rearwardly extending path positioned below the upwardly and forwardly extending path. The first, generally upwardly and forwardly extending path of the conveyor belt includes a first trough section for allowing at least some of the products received from the input point to settle within the flights; a first upwardly inclined section, downstream from the first trough section, for causing products not securely settled within the flights to fall back to the first trough section; a second trough section, downstream from the first upwardly inclined section; and a second upwardly inclined section, downstream from the second trough section, for causing products not securely settled within the flights to fall back to the second trough section. The second trough section allows at least some of these products to settle back again within the flights. By providing the dual trough sections in this first, generally upwardly and forwardly extending path of the conveyor belt, the collator insures that a greater number of the products will settle within the flights, thereby decreasing the amount of gaps present in the transfer conveyer fed by the collator.

5 Claims, 8 Drawing Sheets

U.S. PATENT DOCUMENTS

| | | |
|---|---|---|
| 3,503,488 A | 3/1970 | Stone |
| 3,601,240 A | 8/1971 | Dominici |
| 3,624,773 A | 11/1971 | Krooss |
| 3,658,167 A | 4/1972 | Zabroski et al. |
| 3,835,985 A | 9/1974 | Johnson |
| 3,924,732 A | 12/1975 | Leonard |
| 3,940,906 A | 3/1976 | Leckband et al. |
| 4,042,098 A * | 8/1977 | D'Agnolo et al. .......... 198/393 |
| 4,082,177 A | 4/1978 | Aidlin et al. |
| 4,183,192 A | 1/1980 | Smaw |
| 4,386,490 A | 6/1983 | Griffith et al. |
| 4,662,152 A | 5/1987 | Simelunas et al. |
| 4,671,042 A | 6/1987 | Moekle et al. |
| 4,685,552 A * | 8/1987 | Anderson et al. ............ 198/389 |
| 4,736,570 A | 4/1988 | Hardage et al. |
| 4,767,116 A | 8/1988 | Eberle |
| 4,827,692 A | 5/1989 | Fiske et al. |
| 4,921,398 A | 5/1990 | Fluck |
| 5,057,055 A | 10/1991 | Michaud et al. |
| 5,069,019 A | 12/1991 | Lodewegen |
| 5,165,218 A | 11/1992 | Callahan, Jr. |
| 5,388,385 A | 2/1995 | Phelps et al. |
| 5,497,871 A | 3/1996 | Ciokevich |
| 5,810,150 A | 9/1998 | Martin et al. |
| 5,893,259 A | 4/1999 | Posge |

\* cited by examiner

PRODUCT COLLATOR

CROSS REFERENCE TO RELATED APPLICATIONS

This application is a Divisional application of Ser. No. 09/430,789, filed Oct. 29, 1999 now U.S. Pat. No. 6,257,393.

BACKGROUND

The present invention is directed to a product collator, and more specifically, to a product collator for unscrambling and conveying cylindrical products, such as frankfurters or cigars, from a hopper bin input to a transfer belt, where gaps between unscrambled products loaded onto the transfer belt and where recirculation of the products through the collator are minimized.

Conventional collator systems, such as the Drake Model 9200 loader and the collator shown in U.S. Pat. No. 5,810,150, include an endless flighted conveyor having a plurality of flights extending in a transverse direction (perpendicular to the direction of travel), where each of the flights are sized to receive a plurality of food products such as frankfurters. The conveyor is fed multiple scrambled food products from a source, such as a hopper. The continuous motion of the conveyor conveys the frankfurters from the bottom of the pile of scrambled frankfurters upwardly toward a rake where any frankfurters lying above the flights are knocked downwardly again toward the hopper. The collator of the '150 patent, rather than using rakes, conveys the food products upward at an extreme angle to cause the food products not securely settled within the flights to fall out from the flights, back to the section of the conveyor where the scrambled food products are fed.

Thereafter, the frankfurters received within the flights are conveyed to the bottom of the conveyor and are held within the flights by a rear cage extending adjacent to the conveyor as it travels downwards and rearwards towards the hopper again. The frankfurters within the flights are conveyed to a belt that is positioned at the very bottom of the unscrambling conveyor, where the belt travels in a direction perpendicular to the travel of the unscrambling conveyor. This belt transports the frankfurters positioned within the flights to discharge side of the associated flights. Thereafter, the frankfurters are conveyed to a discharge opening in the cage positioned on the discharge side of the conveyor belt so that one or two rows of the frankfurters will fall through the discharge opening onto a transfer conveyor, which transports the unscrambled frankfurters in an ordered fashion to a loading head for packaging.

A disadvantage with this conventional collator is that it is possible for an undesirable amount of "recirculation" to take place. That is, it is possible for an undesirable number of the food products to be retained on the flighted conveyor for an undesirable amount of time. For example, it is possible for a food product positioned within a flight, on the side of the conveyor opposite the discharge side, never to be transported to the discharge side of the conveyor, if new food products are continuously received within the flight between the old food product and the discharge side of the conveyor. Another disadvantage with this type of conventional collator is that it does not easily accommodate different diameters of the cylindrical products.

SUMMARY

The present invention provides an improved product collator comprising an endless conveyor belt that includes a plurality of laterally extending flights. While the invention is specifically designed for cylindrical products, such as frankfurters, it is within the scope of the invention to collate products of other various shapes. The conveyor belt includes a first, generally upwardly and forwardly extending path and a second, generally rearwardly extending path positioned below the upwardly and forwardly extending path. The first, generally upwardly and forwardly extending path of the conveyor belt includes a first trough section for allowing at least some of the products to settle within the flights; a first upwardly inclined section, downstream from the first trough section, for causing products not securely settled within the flights to fall back to the first trough section; a second trough section, downstream from the first upwardly inclined section; and a second upwardly inclined section, downstream from the second trough section, for causing products not securely settled within the flights to fall back to the second trough section. The second trough section allows at least some of these products to settle back again within the flights. Accordingly, having the dual trough sections in this first, generally upwardly and forwardly extending path of the conveyor belt insures that a greater number of the products will settle within the flights, thereby decreasing the amount of gaps present in the transfer conveyer fed by the collator.

The collator also comprises a first transport belt running in a direction perpendicular to the direction of the conveyor belt and positioned immediately adjacent to the flights, downstream from the second upwardly inclined section (and preferably in the second, generally rearwardly extending path), for transporting the products secured within the flights to one lateral side of the conveyor belt; a discharge port, positioned immediately adjacent to the flights, on the one lateral side of the conveyor belt, and downstream from the first transport belt, for allowing products secured within the flights and transported to the one lateral side of the conveyor belt to be discharged therethrough; and a second transport belt running in the same direction as the first transport belt and positioned immediately adjacent to the flights, downstream from the discharge port and upstream from a product receiving point, for transporting the products remaining secured within the flights (after passing the discharge port) to the one lateral side of the conveyor belt before the flights arrive at the product receiving point. This second transport belt reduces recirculation of the products through the collator in that it guarantees that any new products received in the flights while passing through the product receiving point (i.e., the first trough section), will be received on the side of the remaining product(s) opposite the discharge side of the flights.

Each of the flights include a back wall extending outwardly from the conveyor belt and laterally there across, for securing products within the flights, where the back wall has at least an end portion angled towards the direction of travel of the conveyor belt. Preferably, this end portion is angled towards the direction of travel at approximately 40° to approximately 50°; and the back wall is approximately one inch and the end portion thereof is approximately one-half inch. Such dimensions and angles for the back wall of the flight permits a wide range of cylindrical products (such as frankfurters) to be received and conveyed therein. In an alternate embodiment of the flights, the entire back wall portion is angled towards the direction of travel at, preferably, approximately 40° to approximately 50°; and preferably extends approximately 1 inch from the conveyor belt.

It is also preferred that the first upwardly inclined section of the first, generally upwardly and forwardly extending path of the conveyor belt extends upwardly at a first angle and the second upwardly inclined section extends upwardly at a second angle that is steeper than the first angle. Preferably, this second angle is substantially vertical or even extends beyond vertical. Therefore, in combination with the dimensions and angles of the flights described above, the extreme angles of the second upwardly extending section of the conveyor belt insures that all products not securely received within the flights (i.e., products that are not seated securely within the flights or products that are overlapping other products within the flights) will fall from the flights back to the second trough section of the conveyor belt when traveling in this second upwardly inclined section. Accordingly, with such a design, rakes or other devices positioned above the conveyor belt are not required to discharge unseated product articles from the flights.

The endless conveyor belt is preferably made up of a plurality of laterally extending, link bars that are pivotally coupled together upon a corresponding plurality of transverse shafts. The links bars are arranged side-by-side and have a plurality of eyelet tabs extending therefrom, through which the transverse shafts extend. The eyelet tabs are sufficiently spaced from one another along the link bars to provide a plurality of openings in the endless conveyor belt so that effective spray cleaning can be achieved. Additionally, the diameter of the eyelet holes in the eyelet tabs are sufficiently larger than the diameter of the transverse shafts so that such spray cleaning of the endless conveyor belt will include the radial spaces between the transverse shafts and the eyelet tabs.

Therefore, it is an aspect of the present invention to provide a product collator that comprises an endless conveyor belt including a plurality of laterally extending flights, the conveyor belt including a first, generally upwardly and forwardly extending path and a second, generally rearwardly extending path positioned downstream from the first upwardly and forwardly extending path; where the first path includes: (a) a first trough section for allowing at least some of the products to settle within the flights, (b) a first upwardly inclined section, downstream from the first trough section, for causing products not securely settled within the flights to fall back to the first trough section, (c) a second trough section, downstream from the first upwardly inclined section, and (d) a second upwardly inclined section, downstream from the first trough section, for causing products not securely settled within the flights to fall back to the second trough section, wherein the second trough section allows at least some of these products to settle back again within the flights.

It is another aspect of the present invention to provide a product collator comprising: (a) an endless conveyor belt including a plurality of laterally extending flights, where the conveyor belt includes a first, generally upwardly and forwardly extending path and a second, generally rearwardly extending path positioned below the first upwardly and forwardly extending paths, where the first path includes a point for receiving scrambled products thereon; (b) a first transport belt, positioned downstream from the receiving point, running in a direction perpendicular to the direction of the conveyor belt and positioned immediately adjacent to the flights for transporting the products secured within the flights to one lateral side of the conveyor belt; (c) a discharge port, positioned immediately adjacent to the flights, on the one lateral side of the conveyor belt, and downstream from the first transport belt, for allowing products secured within the flights and transported to the one lateral side of the conveyor belt to be transferred therethrough; and (d) a second transport belt running in the same direction as the first transport belt and positioned immediately adjacent to the flights, downstream from the discharge port and upstream from the receiving point, for transporting the products remaining secured within the flights (after passing the discharge port) to the one lateral side of the conveyor belt.

Accordingly, it is an object of the present invention to provide a collator apparatus for effectively and efficiently un-scrambling scrambled product articles from an input point (such as a hopper) to an output point (such as a transfer conveyor); it is a further object of the present invention that such collator apparatus be designed to minimize the amount of recirculation of the product articles through the apparatus; it is a further object of the present invention that such collator apparatus be designed to minimize the number of spaces between unscrambled product articles at the output point; and it is an object of the present invention that such collator apparatus provide for efficient and effective cleaning of the various components that contact the product articles. These and other objects and advantages of the present invention will be apparent from the following descriptions, the appended claims and the attached drawings.

DETAILED DESCRIPTION

Figure 1:
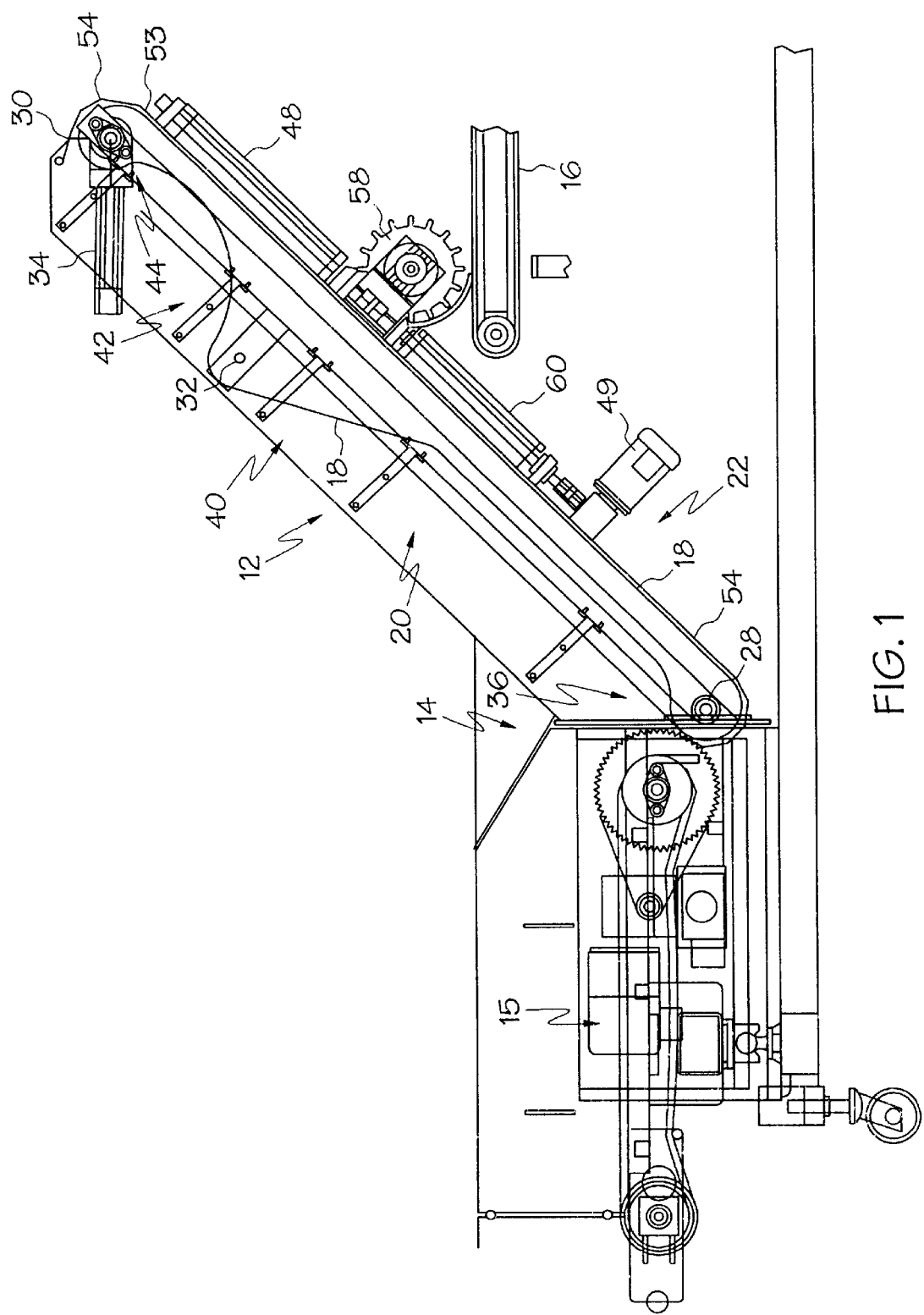
FIG. 1 is an elevational side view of a preferred embodiment of the product collator according to the present invention (some components of this figure being shown as transparent to reveal details of the invention)

As shown in FIG. 1, a product packaging system includes a collator 12 for receiving scrambled product articles from a hopper 14 (driven by a motor 15) and for unscrambling and transferring the unscrambled products to a transfer belt 16, which in turn transports the unscrambled products to a filling head (not shown) for packaging. The collator 12 of the present invention is designed primarily for unscrambling cylindrical products, such as frankfurters, cans, tubes, cigars, etc.; however, it is within the scope of the invention that the collator be used to unscramble other objects of various sizes and shapes. The collator 12 includes an endless conveyor belt 18 having a generally upwardly and forwardly extending path 20 and a generally rearwardly extending path 22 positioned below and downstream from the upwardly and forwardly extending path 20.

Figure 2:
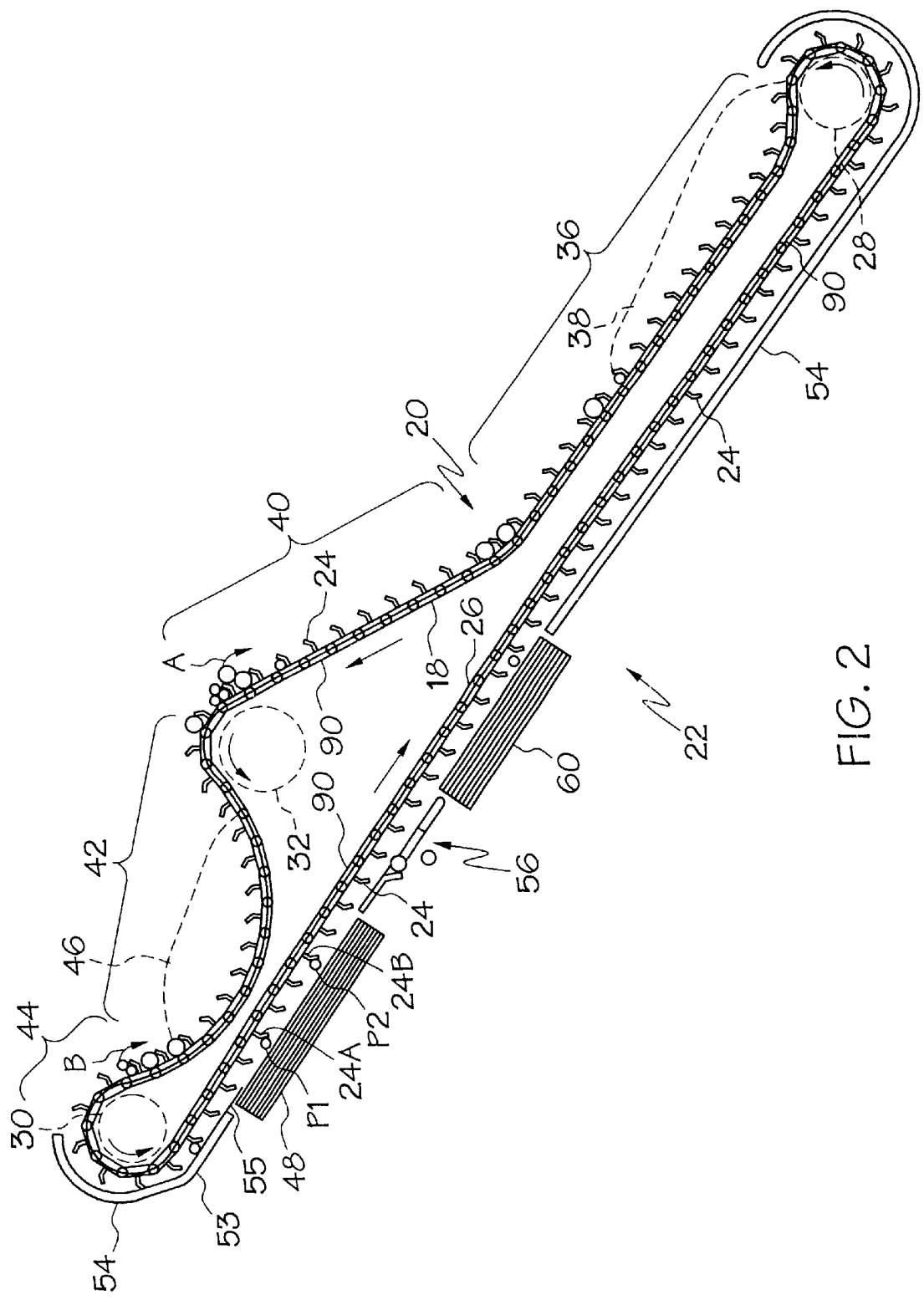
FIG. 2 is an elevational side view of the endless conveyor belt, associated flights, associated transport belts and other associated components in accordance with a preferred embodiment of the present invention.

Referring to FIGS. 1 and 2, the endless conveyor belt 18 is flighted conveyor belt having a plurality of flights 24 carried on a plurality of conveyor belt links 90 that are engaged by a plurality of sprockets 28, 30, 32, which continuously drive the conveyor belt 18 through its generally upwardly and forwardly extending path 20 and its generally rearwardly extending path 22. The uppermost sprocket 30 is preferably a drive sprocket driven by a motor 34.

As shown in FIG. 2, the generally upwardly and forwardly extending path 20 of the endless conveyor belt 18 preferably includes a first trough section 36 for allowing at least some of the scrambled products 38 received from the hopper to be received by and settle in a horizontal orientation within the flights 24; a first upwardly inclined section 40, downstream from the first trough section 36, for causing products not securely settled within, or those doubled up within the flights to fall back to the first trough section (as shown, for example, by arrow A); a second trough section 42, downstream from the first upwardly inclined section 40; and a second upwardly inclined section 44, downstream from the second trough section, for causing products not securely settled within, or those doubled up within the flights to fall back to the second trough section 42 (as shown by arrow B), where the second trough section allows at least some of the scrambled products 46 that have fallen back again from the second inclined section 44 to be received by and settled back again within the flights 24. The use of the two trough sections 36, 42 increases the number of products that are received within the flights during the generally upwardly and forwardly extending path 20 of the conveyor, thereby minimizing the amount of gaps (unfilled flights) in the transfer conveyor 16.

Referring to FIG. 2, preferably, the conveyor belt 18 extends up from the first trough section 36 at an angle of approximately 45° with the horizontal. The first inclined section 40 is, in the preferred embodiment, inclined at approximately 69° with the horizontal; and a preferred range of incline angles for this section is between approximately 40° and approximately 80°. The second inclined section 44 is preferably angled at a much more severe angle than the first inclined section, where the second inclined section 44 may be substantially perpendicular to the horizontal or maybe even angled beyond perpendicular with the horizontal (beyond 90°) as shown by the conveyor in FIG. 1. In the preferred embodiment, the second inclined section 44 is angled with the horizontal at approximately 98°; and a preferred range of incline angles for this section is between approximately 80° and approximately 110° with the horizontal.

Figure 3:
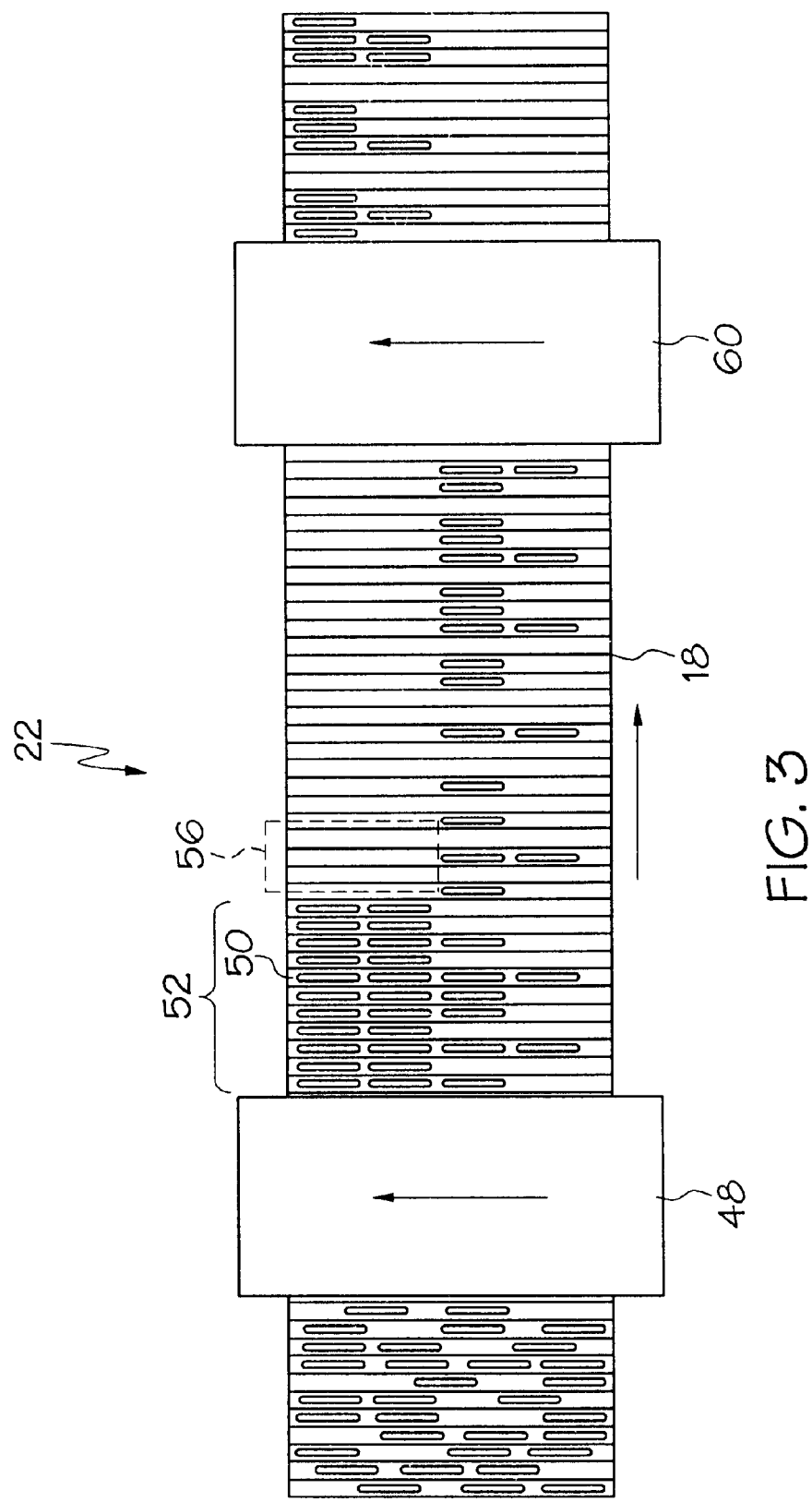
FIG. 3 is a schematic representation of the underside of the endless conveyor belt of FIG. 2, illustrating the function of the transport belts and discharge port.

Referring to FIGS. 1–3, a first transfer belt 48, driven by motor 49, is positioned immediately adjacent to the flights in the generally rearwardly extending path 22 of the conveyor path. This first transfer belt runs in a direction perpendicular to the direction of travel of the endless conveyor belt 18. As shown better in FIG. 2, products are pulled by gravity against the surface of the first transfer belt in this portion of the path; however, because the transport belt remains sufficiently close to the flights, the products will remain within the flights. Because the products are contacted by the transfer belt 48, they are caused to be transported to a lateral end 50 of the conveyor belt 18. As shown in FIG. 3, the products in the portion indicated as 52 have all been transported by the transport belt 48 to the one lateral end 50 of the conveyor belt.

Figure 12:
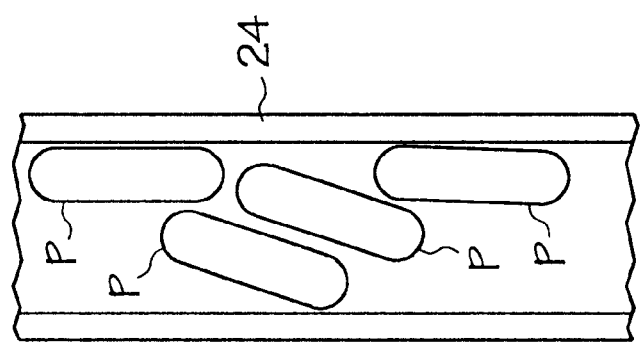
FIG. 12 is a schematic illustration of undesirably "bunched" products in a flight of the endless conveyor.

Preferably, the rearwardly extending path 22 of the conveyor belt 18 (or at least the portions of the rearwardly extending path 22 that are adjacent to a transfer belt) is angled with respect to the horizontal so that the products will be caused to reference the rear walls of the flights 24 immediately downstream of their respective flights when being transported laterally by the transfer belt 48. This is shown in FIG. 2, as products P1 and P2 are referenced against flights 24a and 24b respectively while being conveyed laterally by transfer belt 48. As a result of being referenced against the immediate downstream flight during lateral transport by the transfer belt, the products will be less likely to bunch up next to each other within the flights. See FIG. 12 for an illustration of what is meant by the undesirable "bunching" of products P within a flight 24.

Figure 4:
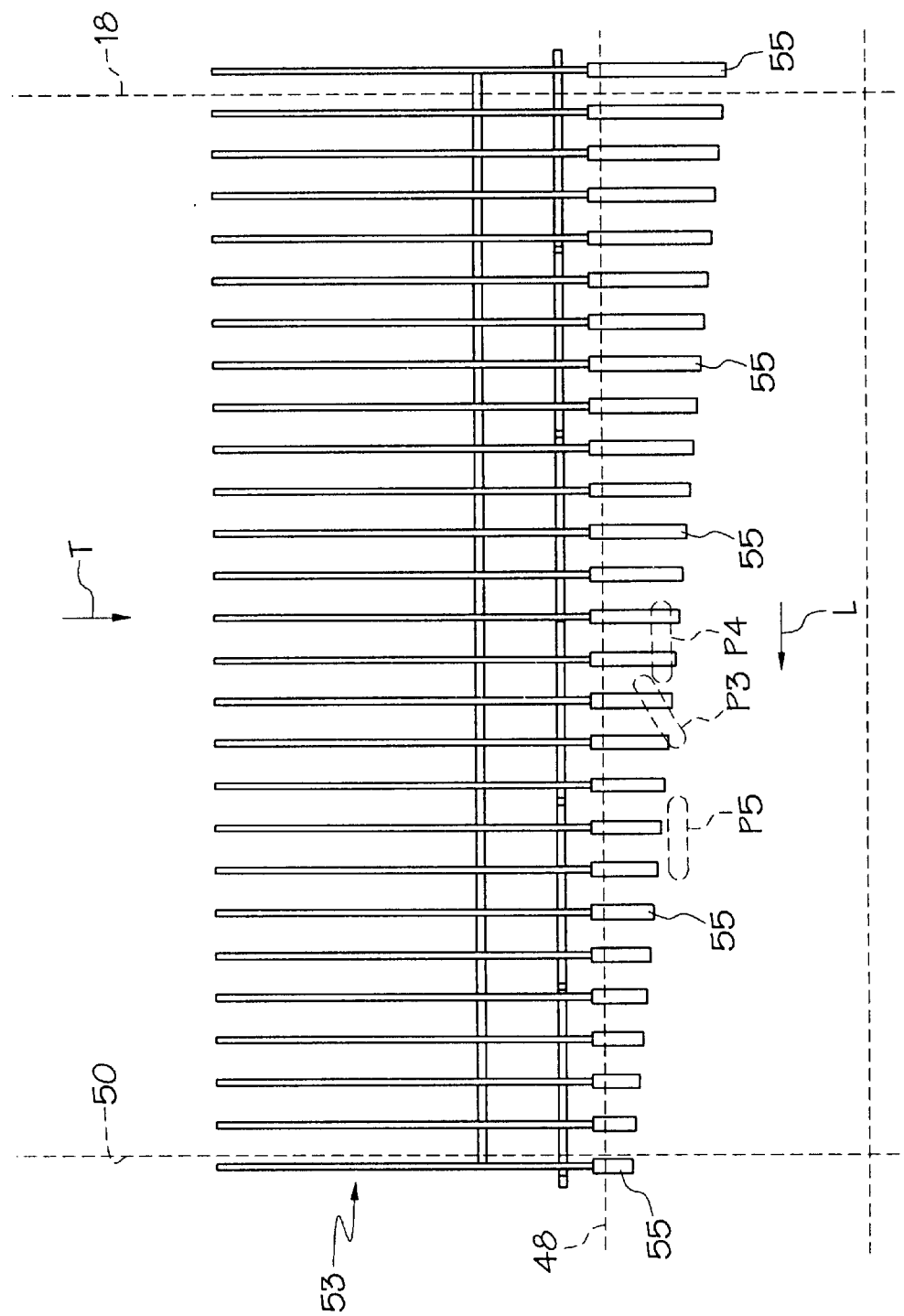
FIG. 4, is a top view of the transfer cage component of the present invention, showing products in phantom to help illustrate the function of the transfer cage.

As shown in FIGS. 2–4, a series of cages or screens 53,54 are also positioned immediately adjacent to the flights along the generally rearwardly extending path 22 of the conveyor belt for keeping the products within the flights 24 as they travel along this generally rearwardly extending path 22 of the conveyor belt.

Referring primarily to FIG. 4, screen 53 controls the introduction of products to the transfer belt 48. The screen 53 includes a plurality of plates 55 extending therefrom in the direction of travel of the conveyor belt 18 over a portion of the transfer belt 48. The plates 55 are transversely distributed along the width of the endless conveyor belt 18 and have a length that increases from the distance from the one lateral end 50 of the conveyor belt 18. Arrow T illustrates the direction of travel for the conveyor belt 18. Arrow L illustrates the direction of travel for the transfer belt 48. The plates, which are positioned between the flights 24 and the transfer belt 48 (see FIG. 2), assure that the ends of the products closest to the one lateral end 50 of the conveyor belt 18 will contact the transfer belt 48 first. This will pull bunched products apart from one another, and thus, minimize bunching of the products within the belts. For example, as shown in FIG. 4, product P3 will be acted upon by transfer belt 48 before product P4 since the design and distribution of the plates insures that the product P3 will contact the transfer belt first. Thus, product P3 will be pulled apart from product P4, the same way that product P5 was pulled apart from product P3.

Referring again to FIGS. 2 and 3, downstream from the first transport belt 48 a discharge port 56 is provided within the series of cages or screens 54 that allows at least one row of the products pushed against the one lateral side 50 of the belt to fall therethrough and thus be received within the star wheel 58 (see FIG. 1), which feeds the transfer conveyor 16. Referring to FIG. 3, in the preferred embodiment, two rows of the products are discharged through the discharge port 56.

Downstream from the discharge port 56 in the generally rearwardly extending path of the conveyor belt (and before products are received on the belt from the hopper), is positioned a second transport belt 60, driven by motor 49. The second transport belt 60 is also positioned immediately adjacent to the flights and also travels in the same direction as the first transport belt 48. This transport belt 60 is provided to transport the products remaining in the flights, after passing the discharge port 56, to the one lateral side 50 of the conveyor belt. Accordingly, the products remaining in the flights 24 downstream of the discharge port 56 will already be to the one side 50 of the conveyor belt when returning to the first trough section 38 of the generally upwardly and forwardly extending path 20 of the conveyor belt. Subsequently, any new products received within the flights will be received on the sides of the existing products opposite the one lateral side 50 of the conveyor belt. This will ensure that, for each flight, the first products received within the flight will be the first products discharged through the discharge port 56, thus minimizing recirculation of the products through the collator.

Although the transport belts 48, 60, discussed above are positioned, in the preferred embodiment, in the rearwardly extending path 22 of the conveyor belt 18; it will be appreciated that it is within the scope of the invention to position the transport belt 48 anywhere along the path of the conveyor belt between a point where products will settle into the flight and the discharge port 56. Likewise, it will be appreciated that it is within the scope of the invention to position the transport belt 60 anywhere along the path of the conveyor belt between the discharge port 56 and a point where products will be received onto the conveyor belt. Furthermore, although the transport belts 48, 60, discussed above utilize gravity to contact the products, it is within the scope of the invention that the belts include means (such as bristles extending therefrom) to contact and transport the products without the assistance of gravity.

Figure 8:
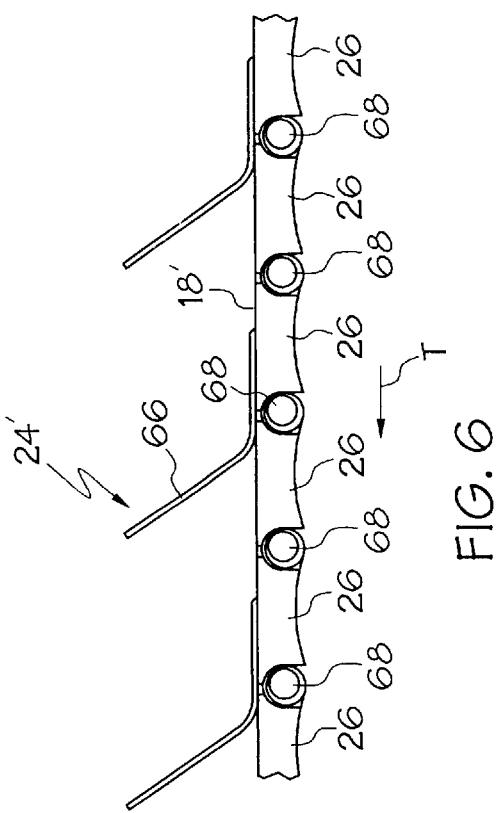
FIG. 8 is a side view of the preferred embodiment of the endless conveyor belt and flights.
Figure 5:
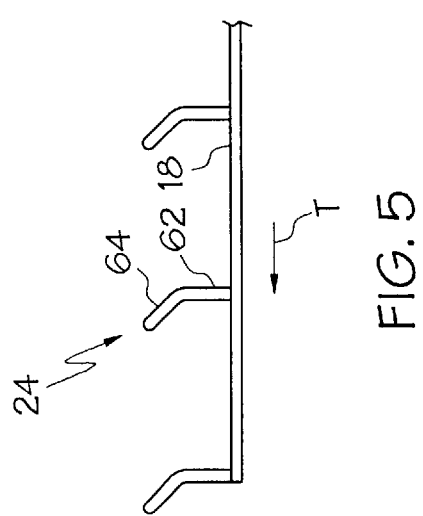
FIG. 5 is a schematic side view of the endless conveyor belt, illustrating the dimensions and orientations of the preferred embodiment of the flights.
Figure 9:
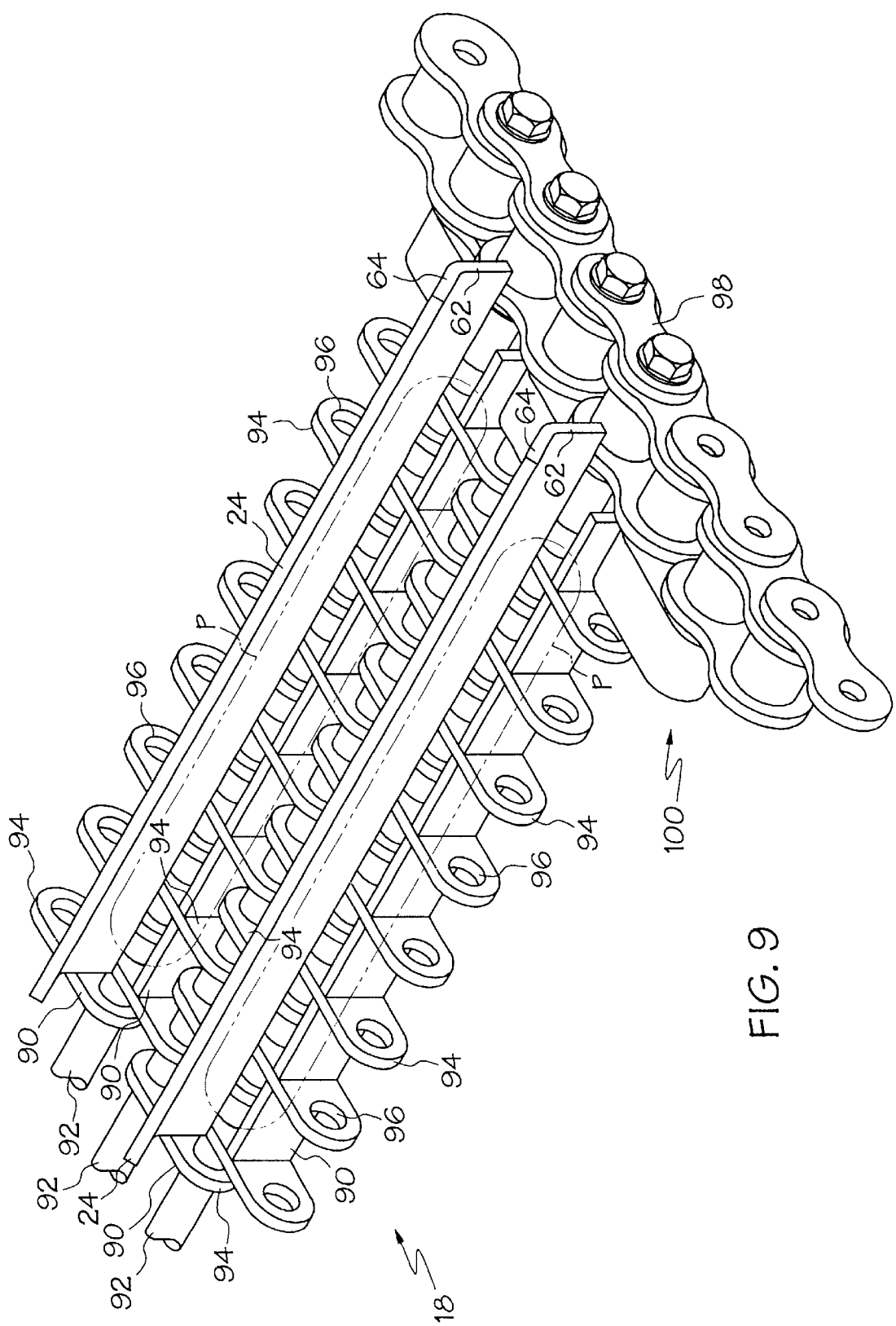
FIG. 9 is a perspective view of the preferred embodiment of the endless conveyor belt and flights of FIG. 8, showing products in phantom.

As shown in FIGS. 5, 8 and 9, it is preferred that the flights 24 have a back wall for supporting the product, where the back wall has a perpendicular portion 62 and an angled end portion 64. The perpendicular portion 62 extending from the conveyor belt 18 is preferably approximately 0.5 inches high. The angled end portion 64 is angled with respect to the conveyor belt and the perpendicular portion 62 towards the direction of travel T of the conveyor belt. The angled end portion 64 is also preferably approximately 0.5 inches long, and angled with respect to the conveyor belt at an angle of approximately 45°. However, it is within the scope of the invention to provide an angle of approximately 30° to approximately 60° degrees for this angled end portion 64. This angle allows a wide range of the cylindrical products (such as frankfurters) having various diameters to be received within and conveyed by the flights 24; and in combination with the incline angle of at least the second inclined section 44, ensures that the products will not be doubled-up on top of each other within the flights. The exact angle will depend, in large part, on the angle of incline for at least the second inclined section 44 of the conveyor and upon the desired range of diameters for the procucts. With the dimensions of the preferred embodiments shown herein, the collator 12 is capable of unscrambling ⅝ inch to 1-⅛ inch diameter products. Of course, if products of larger or smaller ranges of diameters are to be unscrambled, the length dimensions of the flights will change accordingly, while the various angles conveyor belt 18 path and angled end portion 64 of the flights may remain.

Referring to FIGS. 8 and 9 the endless conveyor belt 18 is preferably made up of a plurality of laterally extending, link bars 90 that are pivotally coupled together upon a corresponding plurality of transverse shafts 92. The links bars 90 are arranged side-by-side in parallel, and have a plurality of eyelet tabs 94 extending therebetween, through which the transverse shafts extend. The eyelet tabs 94 are sufficiently spaced from one another along the link bars to provide a plurality of openings in the endless conveyor belt so that effective spray cleaning can be achieved. Additionally, the diameter of the eyelet holes 96 in the eyelet tabs are sufficiently larger than the diameter of the transverse shafts 92 so that such spray cleaning of the endless conveyor belt will include the radial spaces between the transverse shafts and the eyelet tabs. In the preferred embodiment, the diameter of the transverse shafts 92 is approximately 0.31 inches and the diameter of the eyelet holes is approximately 0.34 inches.

The link bars 90 are preferably molded from a thermoplastic material. Flights 24 are preferably molded wit every other longitudinally positioned link bar 90; however, it may be desirable to space the flights 24 farther apart (on every three link bars, for example) or closer together (on every link bar, for example). As shown in FIG. 8, the flights 24 include end tabs 102, positioned at the one lateral end 50 of the belt 18, extending rearwardly from the back wall of the flight. These end tabs 102 will stop the lateral travel of the products against the one lateral end 50 of the belt 18 when being laterally conveyed by either of the transfer belts 48, 60.

As shown in FIG. 9, a chain 98 is coupled to a lateral end 100 of the belt 18, opposite the one end 50 of the belt, for engagement with the toothed drive sprocket 30 (see FIGS. 1 and 2). As will be appreciated by those of ordinary skill in the art, there are numerous ways to drive the belt 18, all of which are incorporated into the present invention.

Figure 6:
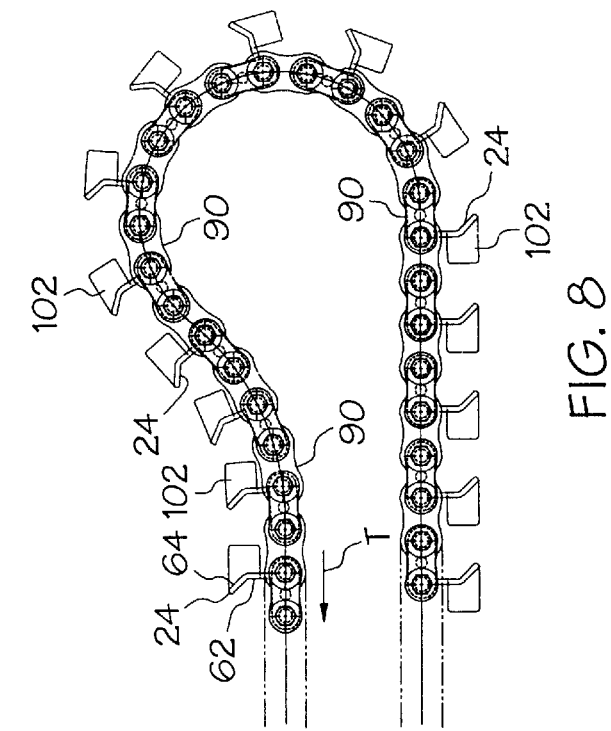
FIG. 6 is an elevational side view of an alternate embodiment of the endless conveyor belt, illustrating an alternate embodiment of the dimensions and orientation of the flights.

As shown in FIG. 6, in an alternate embodiment of the flights 24', the flights are generally L-shaped where the entire back wall portion 66 is angled with respect to the belt 18 at approximately a 55° angle. However, it is within the scope of the invention to provide an angle of approximately 30° to approximately 60°.

Figure 7:
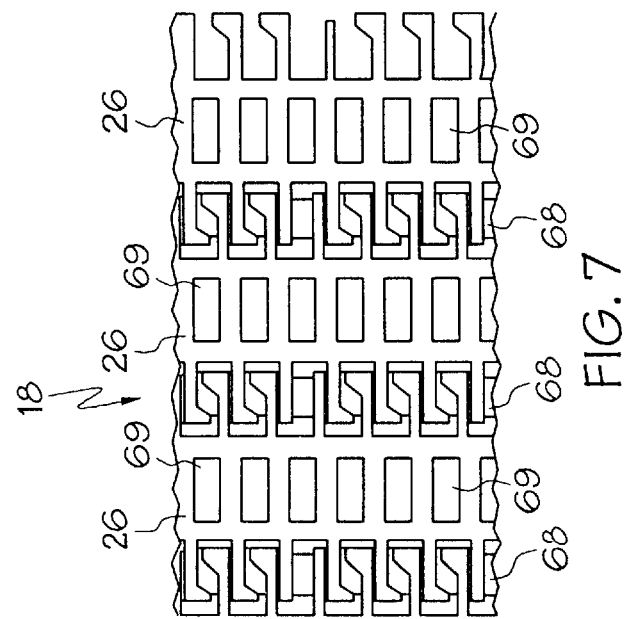
FIG. 7 is a top view of the structure of the endless conveyor belt of FIG. 6 (not showing the flights attached thereto)

Referring to FIGS. 6 and 7, the conveyor belt 18 may be a commercially available belt, where the flights 24' are bonded thereto. This commercially available belt is preferably made up from a plurality of links 26 pivotally coupled together upon a corresponding plurality of transverse shafts 68, where the links include a plurality of holes 69 and gaps extending completely therethrough to facilitate easy spray cleaning of the collator components. It is also preferred that the transport belts 48, 60 be porous as well to facilitate spray cleaning of these components.

Figure 10:
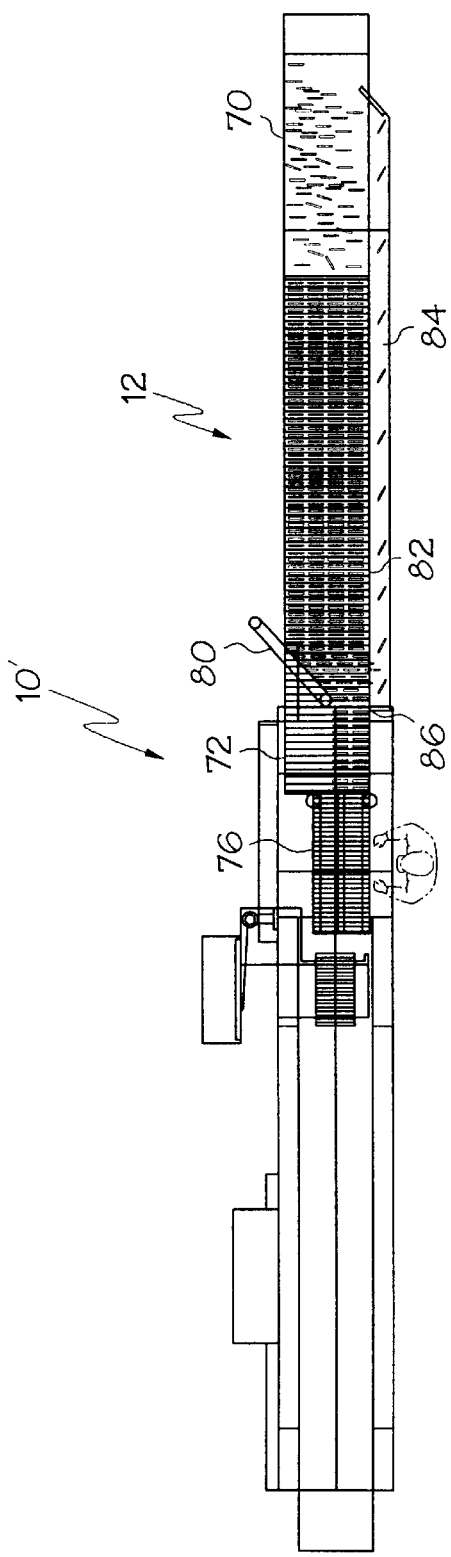
FIG. 10 is a top plan view of a second embodiment of the product collator.
Figure 11:
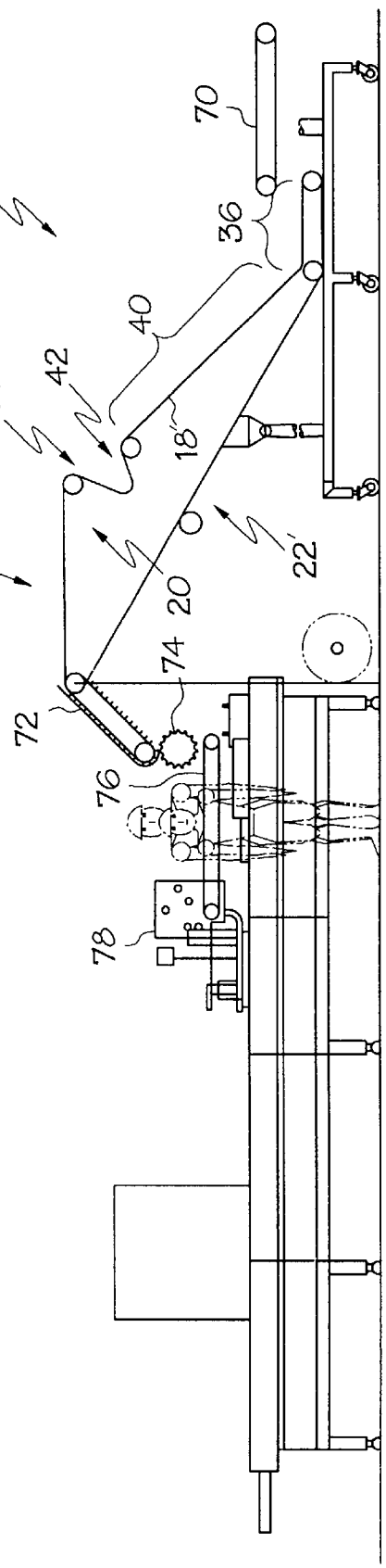
FIG. 11 is an elevational side view of the second embodiment of the product collator shown in FIG. 11.

As shown in FIGS. 10 and 11, an alternate embodiment of the product packaging system 10' includes a collator section 12' for receiving scrambled products from a hopper conveyor 70 and for unscrambling the products and transferring the unscrambled products, two rows at a time, to a transfer conveyor 72. The transfer conveyor transfers the two rows of unscrambled products to a transfer wheel 74, which in turn transfers the two rows of unscrambled products to a input conveyor 76 feeding a product filling head system 78. The collator 12' includes an endless conveyor 18' having a generally forwardly and upwardly extending section 20, substantially similar to that as shown in the embodiment of FIGS. 1 and 2, and rearwardly extending path 22'. As with the embodiment of FIGS. 1 and 2, the generally upwardly and forwardly extending path 20 of the endless conveyor belt 18' includes a first trough section 36, a first upwardly extending section 40, a second trough section 42 and a second upwardly extending section 44. Downstream from the second upwardly extending section 44 is positioned a deflector such as a brush, rake or belt, for example, for deflecting the products positioned within the flights to one lateral side 82 of the conveyor belt. As shown in FIG. 7, the deflector pushes all but two rows of the products over the lateral end of the flights onto an excess conveyor 84, which conveys the products pushed off of the conveyor by the deflector 80 back down to the hopper tub 70. The two rows of products remaining in the flights downstream from the deflector 80 are transferred through a discharge port 86 to the transfer conveyor 72.

While the forms of apparatus herein described constitute preferred embodiments of the invention, it is to be understood that the invention is not limited to these precise forms of apparatus, and that changes may be made without departing from the scope of the invention.

What is claimed is:

1. A product collator comprising:
    an endless conveyor belt including a plurality of laterally extending flights, the conveyor belt including a first, generally upwardly and forwardly extending path and a second, generally rearwardly extending path positioned downstream from the first upwardly and forwardly extending path, wherein scrambled products are introduced onto the conveyor belt at a receiving point along the first upwardly and forwardly extending path;
    a first transport belt running in a direction perpendicular to the direction of the conveyor belt and positioned immediately adjacent to the flights, downstream from the receiving point, for transporting the products secured within the flights to one lateral side of the conveyor belt;
    a discharge port, positioned immediately adjacent to the flights, on the one lateral side of the conveyor belt, and downstream from the first transport belt, for allowing products secured within the flights and transported to the one lateral side of the conveyor belt by the first transport belt to be transferred therethrough; and
    a second transport belt running in the same direction as the first transport belt and positioned immediately adjacent to the flights, downstream from the discharge port and upstream from the receiving point, which transport the products remaining secured within the flights, after passing the discharge port, to the one lateral side of the conveyor belt.

2. The product collator of claim 1, further comprising a cage positioned immediately adjacent to the flights along at least the second path of the conveyor belt for keeping products secured within the flights from falling from the second path of the conveyor belt; wherein the cage includes:
    a transverse gap in line with the first transport belt; and
    a plurality of plates extending from the cage into the transverse gap from an upstream opening of the transverse gap, wherein the plates are distributed along the upstream opening of the transverse gap and increase in length from the one lateral side of the conveyor belt.

3. The product collator of claim 1, wherein at least the sections of the conveyor belt immediately adjacent to the first and second transport belts are angled with respect to the horizontal.

4. A product collator comprising:
    an endless conveyor belt including a plurality of laterally extending flights, the conveyor belt including a first, generally upwardly and forwardly extending path and a second, generally rearwardly extending path positioned downstream from the first upwardly and forwardly extending path, wherein scrambled products are introduced onto the conveyor belt at a receiving point along the first upwardly and forwardly extending path;
    a first transport belt running in a direction perpendicular to the direction of the conveyor belt and positioned immediately adjacent to the flights, downstream from the receiving point, for transporting the products secured within the flights to one lateral side of the conveyor belt;
    a discharge port, positioned immediately adjacent to the flights, on the one lateral side of the conveyor belt, and downstream from the first transport belt, for allowing products secured within the flights and transported to the one lateral side of the conveyor belt by the first transport belt to be transferred therethrough; and
    a cage positioned immediately adjacent to the flights along at least the second path of the conveyor belt for keeping products secured within the flights from falling from the second path of the conveyor belt;
    wherein the cage includes a transverse gap in line with the transport belt; and a plurality of plates extending from the cage into the transverse gap from an upstream opening of the transverse gap; and
    wherein the plates are distributed along the upstream opening of the transverse gap and increase in length from the one lateral side of the conveyor belt.

5. The product collator of claim 4, wherein at least the section of the conveyor belt immediately adjacent to the transport belt is angled with respect to the horizontal.

* * * * *